(12) United States Patent
Suzuki et al.

(10) Patent No.: US 6,872,934 B2
(45) Date of Patent: Mar. 29, 2005

(54) OPTICAL DETECTOR APPARATUS

(75) Inventors: Hideki Suzuki, Fukushima-ken (JP); Kouichi Ogino, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 651 days.

(21) Appl. No.: 09/870,041

(22) Filed: May 30, 2001

(65) Prior Publication Data

US 2001/0048073 A1 Dec. 6, 2001

(30) Foreign Application Priority Data

May 31, 2000 (JP) ........................................ 2000-161421

(51) Int. Cl.[7] .............................. G01D 5/34; H03M 1/22
(52) U.S. Cl. .................................... 250/231.13; 341/13
(58) Field of Search ...................................... 341/11–15

(56) References Cited

U.S. PATENT DOCUMENTS 5,644,127 A    7/1997  Ohmae
6,252,584 B1 *  6/2001  Wu ............................. 345/166
6,323,786 B1 * 11/2001  Sakuma et al. ................ 341/13

* cited by examiner

Primary Examiner—Zandra V. Smith
(74) Attorney, Agent, or Firm—Brinks Hofer Gilson & Lione

(57) ABSTRACT

In a detector apparatus, voltage signals of phase A and phase B are mixed, the mixed signal is divided to obtain a low-voltage signal, and the low-voltage signal is integrally smoothed. The integrally smoothed low-voltage signal is added to each of the voltages obtained by smoothing the voltage signals of the phase A and phase B. The results are used as threshold voltages of comparators constituting a wave-shaping circuit. The threshold voltages change in accordance with the voltage signals of phase A and phase B, achieving a high accuracy of binarization even when the voltage signals Sa and Sb have variations.

17 Claims, 5 Drawing Sheets

OPTICAL DETECTOR APPARATUS

This application claims the benefit of priority to Japanese patent application 2000-161421 filed on May 31, 2000.

BACKGROUND OF THE INVENTION

1. Field of the Invention

The present invention generally relates to optical detector apparatuses for detecting motion. More specifically, the present invention relates to an optical detector apparatus for detecting motion, in which voltage signals having different phases A and B, generated in response to light signals, are converted into binary signals with a high accuracy.

2. Description of the Related Art

FIG. 4A is a circuit diagram of a first conventional detector apparatus. The detector apparatus is used for detecting the distance and direction of motion, for example, rotation of a ball mounted in a mouse apparatus (not shown) which allows inputs to a computer.

The mouse apparatus includes the ball, orthogonal shafts (not shown) rotatably supported and engaged with the ball, encoder disks (not shown) each provided on one end of the associated shaft and each having slits radially formed with a predetermined pitch in a circumferential direction, light emitting devices each opposing one face of the associated encoder disk, and light receiving devices opposing the other face of the associated encoder disk.

When the mouse apparatus is moved, generating rotation of the ball, the shafts rotate in response. Light emitted from each of the light emitting devices provided on one side of the associated encoder disk partially transmits through the slits of the associated encoder disk to reach the light receiving devices provided on the other side of the associated encoder disk.

Referring to FIG. 4A, one of the light emitting devices 2, one of the light receiving devices 3, and wave-shaping circuits 5 and 6 are shown. The light emitting device 2 is typically implemented by a light emitting diode. The light receiving device 3 includes a pair of light receiving elements 3a and 3b each implemented by a phototransistor.

Emitter terminals 3e and 3e' of the light receiving elements 3a and 3b are connected to the reference voltage R, respectively, via resistors 4 and 4' having the same value of resistance. The wave-shaping circuits 5 and 6 are provided subsequent to the resistors 4 and 4'.

The wave-shaping circuits 5 and 6 include two binarization circuits 5A and 6A primarily implemented by comparators. The emitter terminals 3e and 3e' of the light receiving elements 3a and 3b are connected to non-inverting input terminals 5a and 6a of the binarization circuits 5A and 6A, respectively. The emitter terminals 3e and 3e' of the light receiving elements 3a and 3b are connected via resistors 7 and 7' having the same value of resistance, and the node 7a between the resistors 7 and 7' is connected to the reference potential via a capacitor 8. The node 7a is also connected to inverting input terminals 5b and 6b of the binarization circuits 5A and 6A. Output terminals 5c and 6c of the binarization circuits 5A and 6A are connected to the non-inverting inputs 5a and 6a thereof, respectively, via resistors having a predetermined value of resistance, so that positive feedback is provided.

When the light receiving elements 3a and 3b detect light from the light emitting device 2, currents flow in the direction from the collector terminal 3c to the emitter terminals 3e and 3e'. The currents flow through the resistors 4 and 4' to cause voltage drops, thereby generating a voltage signal Sa of phase A and a voltage signal Sb of phase B. As shown in FIG. 5, the voltage signals form sine waves in synchronization with the light signals received by the light receiving elements 3a and 3b, the amplitudes thereof corresponding to the intensity of the light signals. The voltage signals Sa and Sb have a difference in phase due to the positional difference between the light receiving elements 3a and 3b. For example, if the ball rotates in a first direction, the voltage signal Sb is 90 degrees behind the voltage signal Sa, whereas if the ball rotates in a second direction opposite to the first direction, the voltage signal Sa is 90 degrees behind the voltage signal Sb.

The resistors 7 and 7' and the capacitor 8 constitute an integral smoothing circuit. The integral smoothing circuit integrally smoothes the voltage signals Sa and Sb together, a voltage obtained by smoothing being input, as a threshold voltage, to the inverting input terminals 5b and 6b of the binarization circuits 5A and 6A. Then, the binarization circuits 5A and 6A convert the voltage signals Sa and Sb input to the non-inverting terminals 5a and 6a into binary signals with reference to the threshold voltage $V_{TH}$.

For example, the binarization circuit 5A outputs a high-level signal when the voltage signal Sa is larger than the threshold voltage $V_{TH}$, and outputs a low-level signal when the voltage signal Sa is smaller than the threshold voltage $V_{TH}$. Accordingly, the voltage signals Sa and Sb are respectively converted into high-or-low binary signals.

FIG. 4B is a circuit diagram of another conventional detector apparatus. As opposed to the detector apparatus shown in FIG. 4A, the binarization circuits 5A and 6A respectively have integral smoothing circuits 9A and 9B. The voltage signals Sa and Sb are integrally smoothed in the integral smoothing circuits 9A and 9B, respectively, to generate threshold voltages $V_{T1}$ and $V_{T2}$. The binarization circuits 5A and 6A converts the voltage signals Sa and Sb into binary signal Da and Db with reference to the threshold voltages $V_{T1}$ and $V_{T2}$, respectively.

However, the conventional-detector apparatuses suffer the following problems.

The light emitting device 2 and the light receiving device 3 exhibit performance variations due to temperature changes, degradation over time, response characteristics of the light receiving device 3, and difference in dimension and sensitivity between the light receiving elements 3a and 3b. In addition, if the light emitting device 2 and the light receiving device 3 are not mounted at precise positions on a substrate in the mouse apparatus, the characteristics of the voltage signals Sa and Sb are likely to change, causing variations in output signal characteristics.

For example, if the light receiving elements 3a and 3b have quite different characteristics, as shown in FIG. 6, the voltage signal Sa may be positively biased while the voltage signal Sb is negatively biased.

In the conventional detector apparatus shown in FIG. 4A, the mean voltage of the threshold voltage $V_{T1}$ for the voltage signal Sa and of the threshold voltage $V_{T2}$ for the voltage signal Sb serves as the threshold voltage $V_{TH}$ for both of the signals. In this case, the voltage signal Sb does not cross the threshold voltage $V_{TH}$, inhibiting generation of the binary signal Db. That is, if there is a large disparity between the threshold voltage $V_{T1}$ for the voltage signal Sa and the threshold voltage $V_{T2}$ for the voltage signal Sb, the voltage signals Sa and Sb are not properly binarized.

In the detector apparatus shown in FIG. 4B, the threshold voltages $V_{T1}$, and $V_{T2}$ are obtained by integrally smoothing the respective voltage signals Sa and Sb. Thus, when the voltage signals Sa and Sb are not input, i.e., when the mouse apparatus is not moved, power supply noise, external floating noise, etc. are binarized with reference to the threshold voltages $V_{T1}$, and $V_{T2}$ obtained the power supply noise, external floating noise, etc. Thus, the detector apparatus is overly sensitive and detects small disturbances such as the power supply noise, external floating noise, etc., converting undesired signals into binary signals.

Therefore, the conventional detector apparatuses have required complex adjustment on a product-by-product basis in order to avoid component characteristic variations and component displacements and to thereby ensure adequate performance.

SUMMARY OF THE INVENTION

Accordingly, it is an object of the present invention to provide a detector apparatus in which adjustment on a product-by-product basis is not required and in which a plurality of signals having different phases are converted into binary signals with a high accuracy.

To this end, the present invention provides a detector apparatus including a movable member having light-transmitting regions disposed with a predetermined pitch and light-blocking regions between adjacent light-transmitting regions; a pair of photoelectric elements for detecting light signals passing through the light-transmitting regions of the movable member and thereby generating corresponding voltage signals in different phases A and B; and a pair of wave-shaping circuits for generating binary signals in accordance with the voltage signals, the binary signals allowing recognition of direction of movement. In the detector apparatus, one of the pair of wave-shaping circuits, which receives the voltage signal of phase A, and the other of the pair of wave-shaping circuits, which receives the voltage signal of phase B, generate the binary signals using voltages obtained by smoothing the voltage signals as threshold voltages.

Preferably, in the detector apparatus, the pair of wave-shaping circuits is provided with an offset setting unit for providing an offset to the voltages obtained by smoothing the voltage signals, and generates the binary signals using threshold voltages obtained by using the offset.

More preferably, the offset setting unit provides the offset by lowering the mean voltage of the voltage signal of phase A and the voltage signal of phase B and smoothing the lowered voltage, the offset being added to or subtracted from the voltages obtained by smoothing the voltage signals.

Also, it is preferable that the movable member is an encoder disk, on which the light-transmitting regions and the light-blocking regions alternates in a circumferential direction; a light emitting unit being disposed opposing one face of the encoder disk, and the pair of photoelectric elements for generating the voltage signals of the phases A and B being disposed opposing the other face thereof.

More preferably, in the detector apparatus, a spherical rotatable member, the encoder disk which rotates about an X axis in response to rotation of the spherical rotatable member, and the encoder disk which rotates about a Y axis perpendicular to the X axis are provided, the pair of photoelectric elements for generating the voltage signals of the phases A and B being individually provided for each of the encoder disks, and movement in the X-Y coordinate system, corresponding to the direction of rotation of the spherical rotatable member, being detected based on the voltage signals of the phases A and B from the pair of photoelectric elements corresponding to one of the encoder disks and the voltage signals of the phases A and B from the pair of photoelectric elements corresponding to the other encoder disk.

In accordance with the present invention, when the voltage signals of phases A and B are converted into binary signals, the threshold voltage is obtained, for example, by adding a voltage, obtained by lowering the mean voltage of the voltage signal of phase A and the voltage signal of phase B and smoothing the lowered voltage, to the voltage signal of phase A and the voltage signal of phase B, respectively. Thus, binary signals can be properly obtained even when the voltage signals significantly varies. Therefore, less structural adjustment is required when the light emitting device and the photoelectric device have component characteristic variations and when the components are not precisely mounted. In addition, even when light receiving elements corresponding to phase A and phase B in a single photoelectric device have different characteristics, the difference is offset, and the voltage signals of phase A and phase B are accurately converted into binary signals.

Furthermore, the threshold voltages can be set above the level of disturbances such as power supply noise. Thus, generation of undesired binary signals is prevented, particularly when no voltage signals of phase A and phase B are output.

DESCRIPTION OF THE PREFERRED EMBODIMENT

A preferred embodiment of the present invention will now be described with reference to the accompanying drawings.

Figure 1:
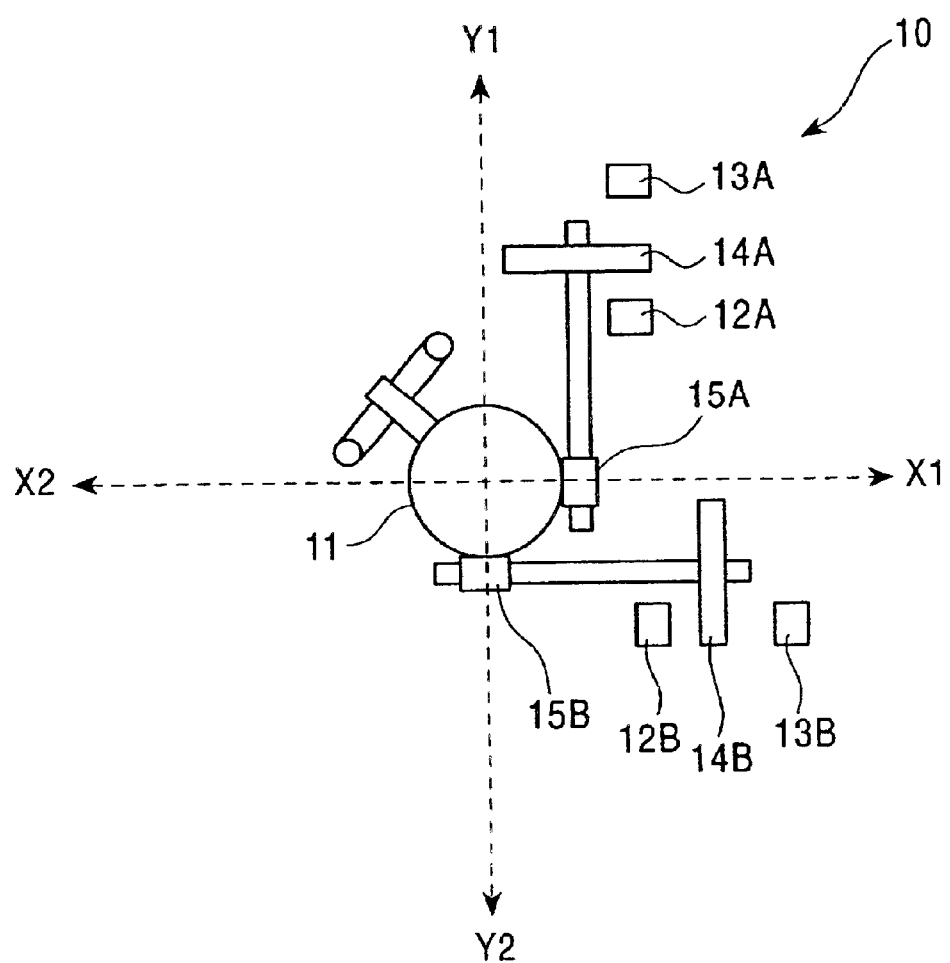
FIG. 1 is a schematic plan view of detector portion incorporated in, for example, a mouse apparatus.

Referring first to FIG. 1, a detector portion of a mouse apparatus 10 includes a ball 11, shafts 15A and 15B, encoder disks 14A and 14B, light emitting units 12A and 12B implemented by light emitting diodes (LEDs), and light receiving units 13A and 13B.

The ball 11 is rotatably supported in contact with the shafts 15A and 15B. The shafts 15A and 15B are orthogonally disposed, and are supported so as to rotate about a vertical axis (Y direction) and a horizontal axis (X direction), respectively, in response to rotation of the ball 11. Each of the light emitting units 12A and 12B is disposed opposing one face of the associated encoder disk 14A and 14B, while each of the light receiving units 13A and 13B is disposed opposing the other face thereof. Each of the encoder disks 14A and 14B includes a plurality of slits radially formed on the outer end portion thereof with a predetermined pitch; that is, light-transmitting regions and light-blocking regions alternate in a circumferential direction. The encoder disks 14A and 14B rotate in association with the shafts 15A and 15B, and thereby transmit or block, in accordance with rotation of the ball 11, light signals from the light emitting units 12A and 12B, respectively.

Figure 2:
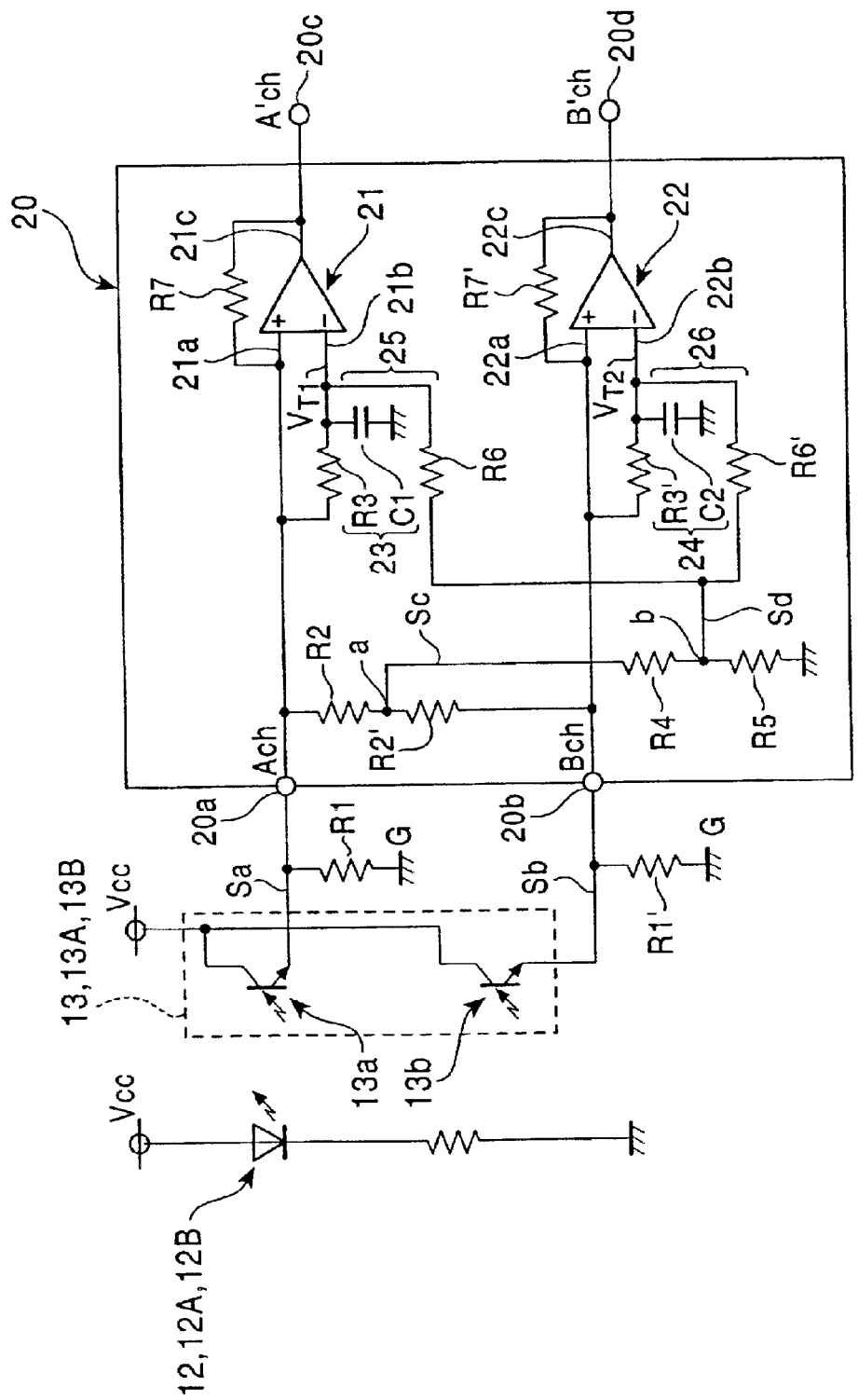
FIG. 2 is a diagram showing the configuration of a detector apparatus according to an embodiment of the present invention.

Referring next to FIG. 2, which is a circuit diagram of a detector apparatus according to an embodiment of the present invention, each of the light receiving units 13A and 13B includes a pair of photoelectric elements 13a and 13b implemented by phototransistors. The photoelectric elements 13a and 13b are provided within a single package at different positions relative to the associated light emitting unit 12A or 12B. The collector terminals of the photoelectric elements 13a and 13b are connected to a power supply voltage $V_{cc}$. The emitter terminals of the photoelectric elements 13a and 13b are connected to a reference voltage G via resistors R1 and R1', and to input terminals 10a and 10b of a wave-shaping circuit 20, respectively.

The wave-shaping circuit includes a plurality of resistors, a plurality of capacitors, and binarization circuits implemented by two comparators 21 and 22. The input terminals 20a and 20b of the wave-shaping circuit 20 are connected to non-inverting input terminals 21a and 22a of the comparators 21 and 22, respectively. To inverting input terminals 21b and 22b of the comparators 21 and 22, a first integral smoothing circuit 23 and a second integral smoothing circuit 24 are connected, respectively. The first integral smoothing circuit 23 is implemented by a resistor R3 and a capacitor C1, and the second integral smoothing circuit 24 is implemented by a resistor R3' and a capacitor C2. The input ends of the first and the second integral smoothing circuits 23 and 24 are connected to the input terminals 20a and 20b of the wave-shaping circuit 20, and the output ends thereof are connected to the inverting input terminals 21b and 22b of the comparators 21 and 22, respectively. The inverting input terminals 21b and 22b and output terminals 21c and 22c of the comparators 21 and 22 are connected via resistors R7 and R7', respectively, providing positive feedback to the comparators 21 and 22. The output terminals 21c and 22c of the comparators 21 and 22 are connected to the output terminals 20c and 20d of the wave-shaping circuit 20, respectively.

The input terminals 20a and 20b of the wave-shaping circuit 20 are connected via resistors R2 and R2'. The node a between the resistors R2 and R2' is connected to the reference voltage G via resistors R4 and R5 connected in series. The node b between the resistors R4 and R5 is connected to the capacitors C1 and C2 via resistors R6 and R6', respectively. The resistor R6 and the capacitor C1 constitutes a third integral smoothing circuit 25, and the resistor R6' and the capacitor C2 constitutes a fourth integral smoothing circuit 26.

The operation of the detector apparatus will be described below.

When the mouse apparatus 10 is moved, the ball 11, the shafts 15A and 15B, and encoder disks 14 and 14 rotate in turn. The photoelectric elements 13a and 13b of each of the light receiving units 13A and 13B receive signals of light emitted from the associated light emitting unit 12A or 12B and passing through the slits of the associated encoder disk 14A or 14B. Then, currents in accordance with the light signals flow through the resistors R1 and R1', generating voltage signals in accordance with the currents. The photoelectric element 13a generates a voltage signal Sa of phase A, and the photoelectric element 13b generates a voltage signal Sb of phase B. The voltage signals Sa and Sb are in synchronization with the light signals, and the amplitudes thereof are in accordance with the intensity of the light signals.

The voltage signals Sa and Sb differ in phase due to the difference of positions between the photoelectric element 13a and the photoelectric element 13b. For example, when the mouse apparatus 10 is moved in the direction X1, with regard to the light receiving unit 13A, the voltage signal Sa is ahead of the voltage signal Sb in terms of phase. Conversely, if the mouse apparatus 10 is moved in the direction X2, the voltage signal Sb is ahead of the voltage signal Sa in terms of phase. When the mouse apparatus 10 is moved in the direction Y1 or Y2, the similar relationship appears between the voltage signals Sa and Sb with regard to the light receiving unit 13B.

Thus, movement of the mouse apparatus 10 can be detected based on the phase relationship between the voltage signals Sa and Sb for each of the light receiving units 13A and 13B.

By way of example, if the reference potential G is half of the power supply voltage $V_{cc}$, the voltage signals Sa and Sb respectively form sine waves with the reference potential G being the center amplitude. The voltage signal Sa is integrally smoothed in the first integral smoothing circuit 23, and the voltage signal Sb is integrally smoothed in the second integral smoothing circuit 24.

The resistors R2 and R2' have the same value of resistance, and the resistors R1 and R1' have the same value of resistance, the resistance value of R2 and R2' being much greater than the resistance value of R1 and R1'. Thus, at the node a, the voltage signal Sa and the voltage signal Sb are added, and the amplitude of the added signal is substantially halved, so a mixed signal Sc is obtained. At the node b, the amplitude of the mixed signal Sc is divided to half by the resistors R4 and R5, so that a low-voltage signal Sd is obtained. The low-voltage signal Sd is input to the third and the fourth integral smoothing circuits 25 and 26. Note that the resistors R4 and R5 may also be set such that Sd is much smaller than Sc rather than merely half of Sc. Examples may include Sd being about ¼, ⅒, ½0, or ⅟100 of Sc. The resistors R4 and R5 may be discrete components such as individual resistors or a potentiometer, or may be integrated into a composite circuit board containing other of the elements.

Accordingly, a voltage obtained by integrally smoothing the low-voltage signal Sd in the third integral smoothing circuit 25 is added, as an offset, to a voltage obtained by integrally smoothing the voltage signal Sa in the first integral smoothing circuit 23, so that a first threshold voltage $V_{T1}$ is input to the inverting input terminal 21b of the comparator 21. A voltage obtained by integrally smoothing the low-voltage signal Sd in the fourth and integral smoothing circuit 26 is added, as an offset, to the voltage signal Sa integrally smoothed in the second integral smoothing circuit 24, so that a second threshold voltage $V_{T2}$ is input to the inverting input terminal 22b of the comparator 22. That is, the resistors R2 and R2', the resistors R4 and R5, and the third and the fourth integral smoothing circuits 25 and 26 constitute an offset setting unit.

Figure 3:
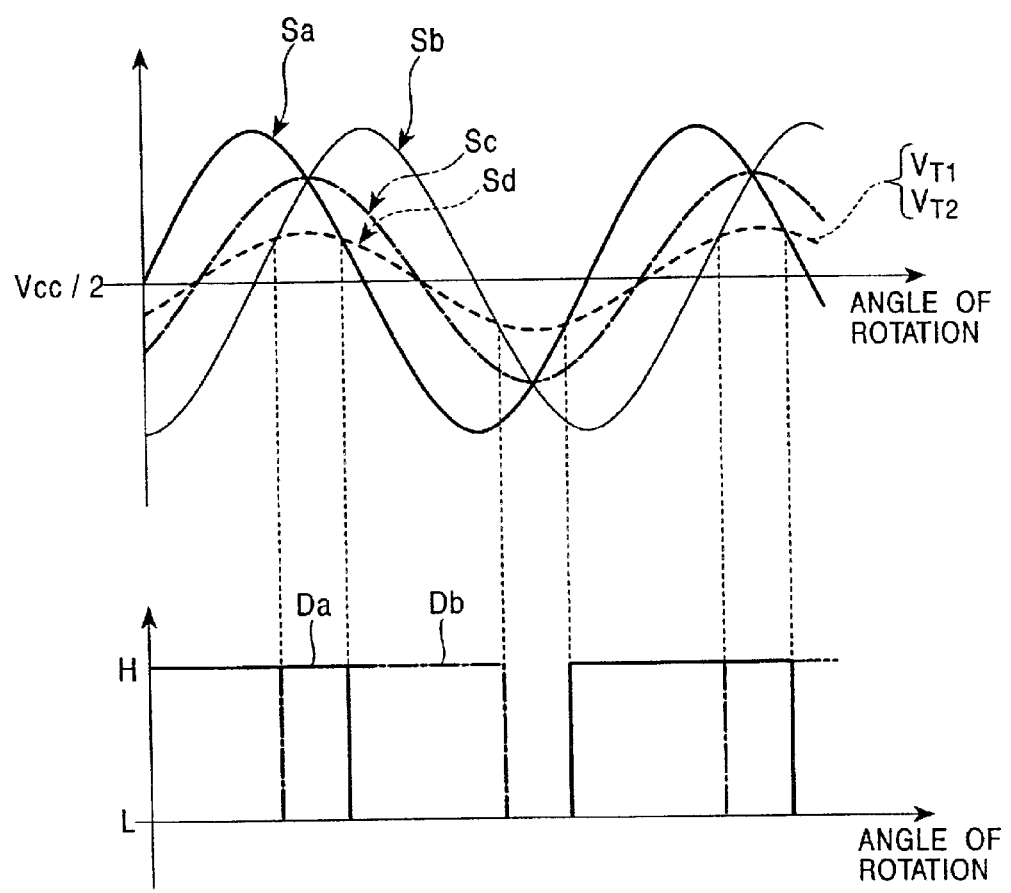
FIG. 3 is a waveform chart showing input signals and output signals of the detector apparatus shown in FIG. 2.
Figure 4A:
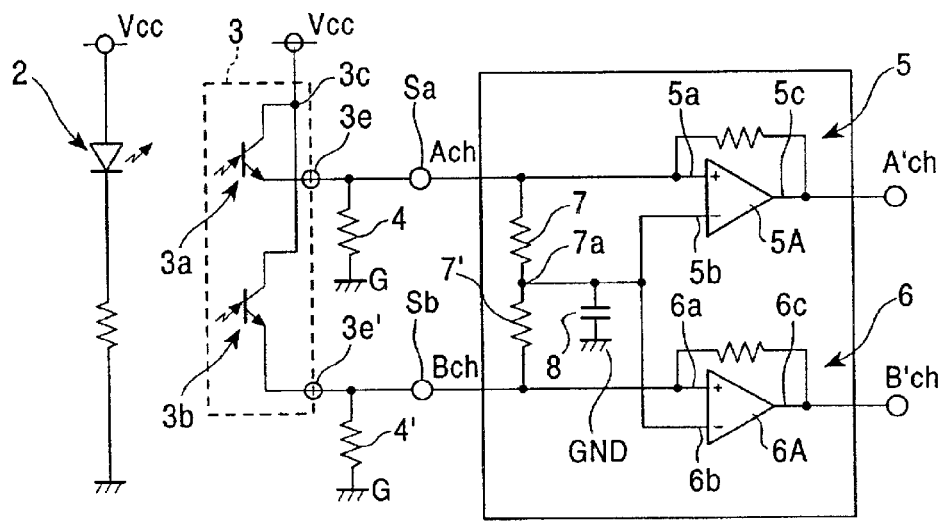
FIGS. 4A and 4B show the configurations of circuits incorporated in conventional detector apparatuses.
Figure 4B:
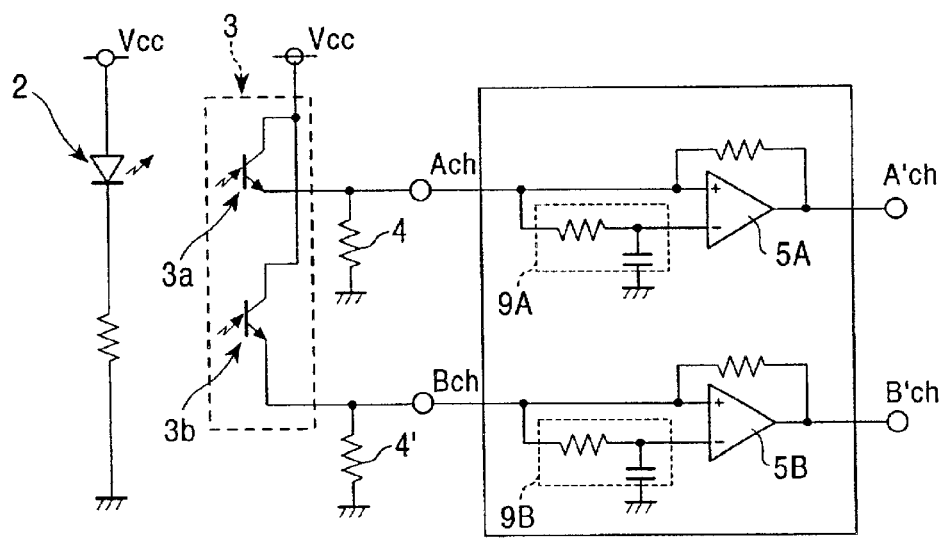
Figure 5:
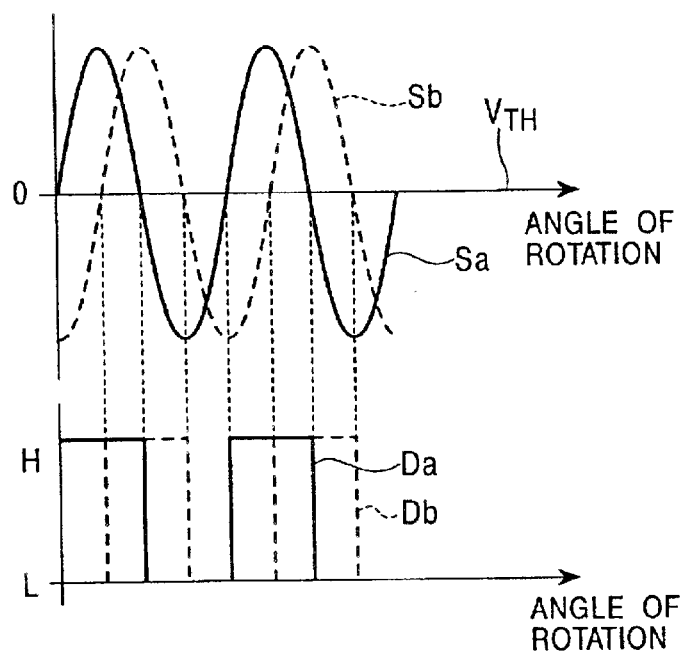
FIG. 5 is a waveform chart illustrating an ideal signal conversion.
Figure 6:
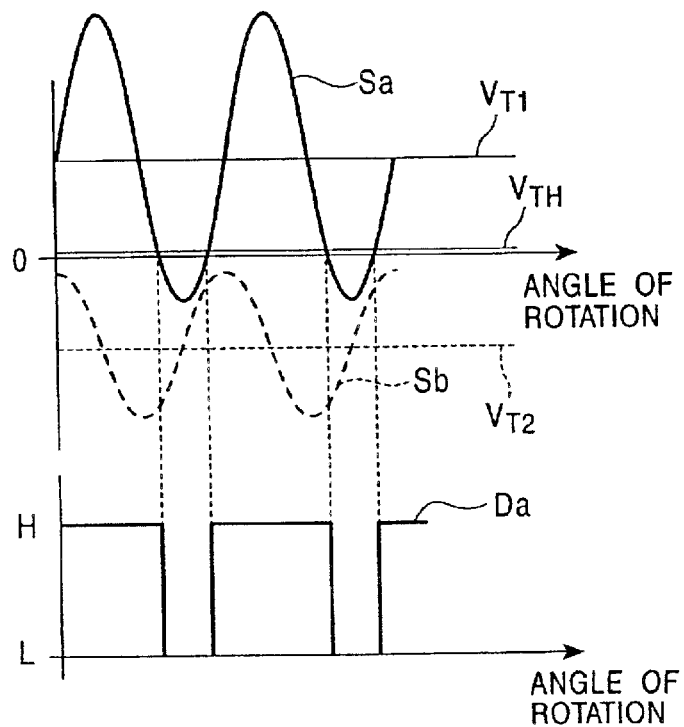
FIG. 6 is a waveform chart illustrating a signal conversion when an input signals of different levels are input to a conventional detector apparatus.

If the voltage signals Sa and Sb have the same amplitude with the $V_{cc}/2$ being the center thereof, as shown in FIG. 3, the voltages obtained by integrally smoothing the voltage signals Sa and Sb are both $V_{cc}/2$. The first and the second threshold voltages $V_{T1}$, and $V_{T2}$ are obtained by adding the low-voltage signal Sd, as an offset, to a voltage obtained by integrally smoothing the voltage signals Sa and Sb. Thus, in this case, the first and the second threshold voltages $V_{T1}$ and $V_{T2}$ are the same as the low-voltage signal Sd. That is, the first and the second threshold voltages $V_{T1}$ and $V_{T2}$ change in accordance with the amplitudes of the voltage signals Sa and Sb, allowing flexible setting of appropriate threshold voltages.

Even when the amplitude and reference voltage differ between the voltage signals Sa and Sb, in a manner similar to the above, the first and the second threshold voltages $V_{T1}$, and $V_{T2}$ are respectively set based on the voltage signals Sa and Sb.

The offset is relatively small compared with the voltages obtained by integrally smoothing the voltage signals Sa and Sb. Thus, the first and the second threshold voltages $V_{T1}$, and $V_{T2}$ are not deviated much from the expected threshold voltages. Thus, the voltage signals Sa and Sb can be binarized using appropriate threshold voltages as the first and the second threshold voltages $V_{T1}$ and $V_{T2}$.

When the mouse apparatus 10 is not in motion, power supply noise may occur. In that case, the first and the second threshold voltages $V_{T1}$, and $V_{T2}$ input to the inverting input terminals 21b and 22b of the comparators 21 and 22 are obtained by adding a low-voltage signal Sd' corresponding to the power supply noise to a mixed signal Sc' corresponding to the power supply noise. Thus, the first and the second threshold voltages $V_{T1}$, and $V_{T2}$ are set above the level of ripple of the power supply noise. Accordingly, the comparators 21 and 22 are prevented from operating in response to the power supply noise and other disturbances, inhibiting undesired binary signals from being generated.

In the above-described detector apparatus, a high-level signal is output when the voltage signal Sa is higher than the first threshold voltage $V_{T1}$, and when the voltage signal Sb is higher than the second threshold voltage $V_{T2}$, whereas a low-level signal is output when the voltage signal Sa is lower than the first threshold voltage $V_{T1}$, and when the voltage signal Sb is lower than the threshold voltage $V_{T2}$.

Binary signals Da and Db thus obtained from the voltage signals Sa and Sb are respectively output from the input terminals 20a and 20b of the wave-shaping circuit 20, and are fed to a computer via an interface (not shown). The computer determines the distance and direction of movement of the mouse apparatus 10 based on the binary signals Da and Db, and accordingly moves a cursor or the like displayed on a monitor.

In the above-described embodiment, the threshold voltages $V_{T1}$, and $V_{T2}$ are dynamically changed in accordance with the voltage signals Sa and Sb, so that the wave-shaping circuit 20 dynamically adjusts to the voltage signals Sa and Sb.

Although in the above-described embodiment, the offset is added to voltages obtained by integrally smoothing the a voltage signals Sa and Sb, it is to be understood that the present invention is not limited thereto, and the, arrangement may be such that the offset is subtracted in subtraction circuits.

Furthermore, although in the above-described embodiment, the offset is obtained by dividing the mixed signal Sc, the offset may be obtained by different ways.

The above-described detector apparatus is unsusceptible to variations in component characteristics, physical changes during assembly, and displacement of components.

It is to be appreciated that the present invention is applicable to any detector apparatus in which movement is detected based on a difference in phase between voltage signals having different phases obtained by using light emitting elements and light receiving elements.

Although in the above-described embodiment, the arrangement is such that two signals are binarized, the arrangement may be such that three or more signals are respectively binarized. Similarly to the above-described embodiment, each of the voltage signals is input to the node a via a resistor so that a mixed signal is generated, and the mixed signal is divided at the node b to generate a low-voltage signal, the low-voltage signal being input to the inverting inputs of each comparator.

Similarly, emitters and detectors that respectively emit and detect electromagnetic signals at frequencies other than optical or near-IR may be used, as long as appropriate components that alternately block and transmit these signals are also supplied.

What is claimed is:

1. A detector apparatus comprising:
    a movable member having light-transmitting regions disposed with a predetermined pitch and light-blocking regions between adjacent light-transmitting regions;
    a pair of photoelectric elements to detect light signals passing through said light-transmitting regions of said movable member and thereby generate corresponding voltage signals in different phases A and B when the movable member is moved; and
    a pair of wave-shaping circuits to generate binary signals in accordance with said voltage signals, said binary signals to allow recognition of a direction of movement of the movable member, each wave-shaping circuit including a smoothing circuit to smooth the respective voltage signal and obtain a threshold voltage and a comparator to compare the respective voltage signal and the respective threshold voltage and thereby generate one of the binary signals,
    wherein said pair of wave-shaping circuits is provided with an offset setting unit that provides an offset to the voltages obtained by smoothing said voltage signals, and generates said binary signals using threshold voltages obtained by using said offset.

2. A detector apparatus according to claim 1, wherein said offset setting unit provides said offset by lowering a mean voltage of the voltage signal of phase A and the voltage signal of phase B and smoothing the lowered voltage, said offset being added to or subtracted from the voltages obtained by smoothing said voltage signals.

3. A detector apparatus according to claim 1, wherein said movable member is an encoder disk on which said light-transmitting regions and said light-blocking regions alternate in a circumferential direction and having two faces, a light emitting unit is disposed opposing one face of the encoder disk, and said pair of photoelectric elements are disposed opposing the other face of the encoder disk.

4. A detector apparatus according to claim 3, further comprising a spherical rotatable member, an encoder disk which rotates about an X axis in response to rotation of said spherical rotatable member, and an encoder disk which rotates about a Y axis perpendicular to said X axis, said pair of photoelectric elements individually provided for each of the encoder disks,
    wherein movement in an X-Y coordinate system, corresponding to a direction of rotation of said spherical rotatable member, being detected based on said voltage signals of the phases A and B from the pair of photoelectric elements corresponding to one of the encoder disks and the voltage signals of the phases A and B from the pair of photoelectric elements corresponding to the other encoder disk.

5. A method of detecting movement of a movable member, the method comprising:
    positioning an encoder disk that forms the movable member between a light source and light detectors;
    generating the light signals using the light source;
    detecting the light signals passing through light-transmitting regions of said movable member;
    generating voltage signals in different phases A and B corresponding to the detected light signals;
    smoothing the voltage signals;
    obtaining threshold voltages from the smoothed voltage signals;
    comparing the voltage signals and the threshold voltage;
    generating binary signals from the comparisons;
    rotating a spherical rotatable member;
    rotating an encoder disk about an X axis in response to rotation of said spherical rotatable member;
    rotating an encoder disk which rotates about a Y axis perpendicular to said X axis; and
    detecting movement in an X-Y coordinate system corresponding to a direction of rotation of said spherical rotatable member.

6. The method according to claim 5, further comprising:
    providing an offset to the smoothed voltage signals; and obtaining the threshold voltages from the smoothed voltage signals having the offset.

7. The method according to claim 6, further comprising:

providing said offset by averaging the voltage signals to produce a mean voltage, lowering the mean voltage, and smoothing the lowered voltage; and arithmetically altering the smoothed voltage signals by the smoothed lowered voltage.

8. The method according to claim 7, wherein the arithmetically altering comprises adding the smoothed lowered voltage to the smoothed voltage signals.

9. The method according to claim 7, wherein the arithmetically altering comprises subtracting the smoothed lowered voltage from the smoothed voltage signals.

10. A method of detecting movement of a movable member, the method comprising:

detecting signals that correspond to movement of the movable member;

dynamically adjusting threshold levels to vary with changes in the detected signals;

comparing the detected signals with the threshold levels;

generating binary signals from the comparisons;

rotating a spherical rotatable member;

rotating an encoder disk about an X axis in response to rotation of said spherical rotatable member;

rotating an encoder disk which rotates about a Y axis perpendicular to said X axis; and detecting movement in an X-Y coordinate system corresponding to a direction of rotation of said spherical rotatable member.

11. The method of claim 10, further comprising detecting movement of the movable member based on phase differences between the detected signals.

12. The method of claim 10, wherein the detecting comprises detecting light signals passing through light-transmitting regions of said movable member.

13. The method of claim 10, further comprising smoothing the detected signals prior to dynamically adjusting the threshold signals.

14. The method of claim 13, further comprising providing an offset to the smoothed signals prior to dynamically adjusting the threshold signals.

15. The method according to claim 14, further comprising:

averaging the signals to produce a mean signal, lowering the mean signal, and smoothing the lowered signal to provide the offset; and arithmetically altering the smoothed signals by the smoothed lowered signal.

16. A detector apparatus comprising:

a movable member having light-transmitting regions disposed with a predetermined pitch and light-blocking regions between adjacent light-transmitting regions;

a pair of photoelectric elements to detect light signals passing through the light-transmitting regions of the movable member and thereby generate corresponding voltage signals in different phases A and B when the movable member is moved; and a pair of wave-shaping circuits to generate binary signals in accordance with the voltage signals, the binary signals to allow recognition of a direction of movement of the movable member, each wave-shaping circuit including a smoothing circuit to smooth the respective voltage signal and obtain a threshold voltage and a comparator to compare the respective voltage signal and the respective threshold voltage and thereby generate one of the binary signals, wherein the movable member is an encoder disk on which the light-transmitting regions and the light-blocking regions alternate in a circumferential direction and having two faces, a light emitting unit is disposed opposing one face of the encoder disk, and the pair of photoelectric elements are disposed opposing the other face of the encoder disk, the detector apparatus further comprises a spherical rotatable member, an encoder disk which rotates about an X axis in response to rotation of the spherical rotatable member, and an encoder disk which rotates about a Y axis perpendicular to the X axis, the pair of photoelectric elements are individually provided for each of the encoder disks, wherein movement in an X-Y coordinate system, corresponding to a direction of rotation of the spherical rotatable member, being detected based on the voltage signals of the phases A and B from the pair of photoelectric elements corresponding to one of the encoder disks and the voltage signals of the phases A and B from the pair of photoelectric elements corresponding to the other encoder disk.

17. A method of detecting movement of a movable member, the method comprising:

detecting light signals passing through light-transmitting regions of said movable member;

generating voltage signals in different phases A and B corresponding to the detected light signals;

smoothing the voltage signals to form smoothed voltage signals;

generating an offset by averaging the voltage signals to produce a mean voltage, lowering the mean voltage, and smoothing the lowered voltage;

arithmetically altering the smoothed voltage signals by adding the offset to or subtracting the offset from the smoothed voltage signals;

obtaining threshold voltages from the arithmetically altered smoothed voltage signals;

comparing the voltage signals and the threshold voltage; and generating binary signals from the comparisons.

* * * * *